United States Patent
Watanabe et al.

(10) Patent No.: US 6,999,631 B1
(45) Date of Patent: Feb. 14, 2006

(54) IMAGE PROCESSING APPARATUS AND METHOD

(75) Inventors: Masahiro Watanabe, Kawasaki (JP); Akiko Sakaguchi, Kawasaki (JP); Koichi Fujimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 09/714,294

(22) Filed: Nov. 17, 2000

(30) Foreign Application Priority Data

Nov. 19, 1999 (JP) ................................. 11-329000

(51) Int. Cl.
*G06K 9/40* (2006.01)

(52) U.S. Cl. ...................... 382/266; 382/260; 358/477; 358/463; 358/533

(58) Field of Classification Search ........ 382/266–269, 382/263, 264, 260, 272, 274, 275, 172; 348/597, 348/625; 358/447, 448, 462, 530, 533, 463
See application file for complete search history.

(56) References Cited

U.S. PATENT DOCUMENTS

| | | | | |
|---|---|---|---|---|
| 5,023,919 | A | | 6/1991 | Wataya ........................ 382/263 |
| 5,231,677 | A | | 7/1993 | Mita et al. .................... 382/266 |
| 5,392,137 | A | | 2/1995 | Okubo ......................... 358/462 |
| 6,026,184 | A | * | 2/2000 | Fukushima .................. 382/199 |
| 6,075,902 | A | * | 6/2000 | Kojima ........................ 382/260 |
| 6,373,992 | B1 | * | 4/2002 | Nagao ......................... 382/266 |
| 6,549,656 | B1 | * | 4/2003 | Lin ............................. 382/173 |

FOREIGN PATENT DOCUMENTS

| | | |
|---|---|---|
| JP | 61-157160 | 7/1986 |
| JP | 5-307603 | 11/1993 |

OTHER PUBLICATIONS

Mahamud, Shyjan, et al., "Segmentation of Salient Closed Contours from Real Images", IEEE, 1999.

* cited by examiner

*Primary Examiner*—Samir Ahmed (57) ABSTRACT

An image processing technique for generating a multi-valued image with fine contours from an input image that is generated by reading, as a multi-valued image, the dotted print contents of printed matter. An image processing apparatus of the present invention generates a contour extracted image by performing the contour extraction process for the input image, and deletes contours from the contour extracted image that satisfy a predetermined condition to generate a partial contour image. Then, the apparatus adds contours to the partial image according to the density distribution of the contour in the partial contour image, and generates a contour added image. By referring to the contour added image, the apparatus superimposes the input image and a smoothed image obtained by performing a smoothing process for the input image to generate a synthesized image. Since contours that satisfy a predetermined condition are deleted from the contour extracted image, the moire patterns included in the contour extracted image are removed. In addition, since contours are added according to the density distribution of the contour, necessary contours can be recovered.

14 Claims, 5 Drawing Sheets

IMAGE PROCESSING APPARATUS AND METHOD

TECHNICAL FIELD OF THE INVENTION

The present invention relates to an image processing technique, and more particularly to an image processing technique for generating a clear multi-valued image from an input image that is generated by reading, as a multi-valued image, print contents, and which includes printing dots and moire patterns.

BACKGROUND OF THE INVENTION

In a conventional art, first, an input image is generated by reading dotted contents of printed matter into a computer, as a multi-valued image. Then, printing dots, which are produced by printing, and interference fringes (moire patterns) are removed from the input image by a smoothing process. Thereafter, a contour emphasizing process is performed to recover contours for which level has been lowered by the smoothing process. Finally, a smooth multi-valued image (also called a multi-level image) is obtained.

In such a conventional process, however, when a high-level smoothing process is performed to remove as many as possible of the printing dots or moire patterns, the contour information for a portion of the input image having an originally low contour level is completely lost, so that the contour of that portion can not be recovered by the contour emphasizing process.

SUMMARY OF THE INVENTION

To resolve this shortcoming, it is an objective of the present invention to provide an image processing technique for generating a multi-valued image with distinct contours from an input image that is generated by reading, as a multi-valued image, the dotted print contents of printed matter, and which includes printing dots and moiré patterns.

An image processing apparatus according to a first aspect of the present invention, comprises: a contour image generator for generating a contour image from an input image generated by reading, as a multi-valued image, print contents (a dotted image) of printed matter; a contour adder for adding contours to the contour image by referring to a contour density distribution in the contour image to generate a contour added image (a contour expanded image in the preferred embodiment); and an image synthesizer for superimposing the input image and a smoothed image obtained by performing a smoothing process for the input image, by referring to the contour added image, to generate a synthesized image (a superimposed image in the preferred embodiment). Since the contours are added in accordance with the contour density distribution in the contour image, a necessary contour portion can be recovered. As a result, a multi-valued image with distinct contours can be obtained.

The image processing apparatus of the first aspect of the present invention may also include means for performing a smoothing process for the input image to generate a smoothed image, and/or means for performing a contour extraction process for the input image to generate a contour extracted image.

The image processing apparatus of the first aspect may include a storage device for storing the input image, the contour image, the contour added image, the smoothed image, and the synthesized image.

The aforementioned contour image generator may include deletion means for deleting a contour pixel within the contour image, which satisfies at least one condition wherein a contour level of the contour pixel is equal to or smaller than a first threshold value. By deleting contour pixels satisfying at least one condition in which a contour level of the contour pixels are equal to or smaller than a first threshold value, moire patterns and the like which are included in the contour image can be removed. As a result, the multi-valued image with distinct contours can be obtained. The contour image from which contour pixels satisfying the aforementioned condition are deleted may be called a partial contour image in the preferred embodiment.

Further, the first threshold value may be a value for a contour level higher than a contour level caused by printing dots that result from printing and moire patterns that occur when the print contents are read into. As a result, printing dots and moire patterns can be completely removed from the contour image.

The aforementioned contour adder may include determination means for scanning the contour image with a predetermined window, and for determining whether the density of contour pixels in the predetermined window is equal to or greater than a second threshold value. The density distribution of contours can be analyzed by scanning with the predetermined window.

In addition, the aforementioned contour adder may further include: means for calculating an average value of contour levels of contour pixels in the predetermined window; and change means for changing the contour level of a target pixel in the predetermined window to said average value if the density of the contour pixels in the predetermined window is equal to or greater than the second threshold value, and the contour level of the target pixel in the predetermined window is smaller than the average value. If the density of the contour pixels in the predetermined window is equal to or greater than the second threshold value, and the target pixel in the predetermined window are not a contour pixel, the target pixel can be changed into a contour pixel.

It is possible to configure the aforementioned image synthesizer to determine a superimposition ratio for a pixel value of a pixel in the input image and a pixel value of a corresponding pixel in said smoothed image by referring to the contour levels of respective pixels in the contour added image, and to generate the synthesized image according to the superimposition ratio.

The aforementioned superimposition ratio may be determined by substituting the contour levels of the respective pixels in the contour added image into a predetermined function.

An image processing program, that is a second aspect of the present invention, causes a computer to perform the steps of: generating a contour image from an input image generated by reading, as a multi-valued image, print contents of printed matter into; adding contours to the contour image by referring to a contour density distribution in the contour image, and generating a contour added image; and superimposing the input image and a smoothed image obtained by performing a smoothing process for the input image, by referring to the contour added image, and generating a synthesized image.

Modifications of the first aspect of the present invention can be applied to the image processing program of the second aspect.

The image processing program is stored on a storage medium or a storage device, such as a floppy disk, a CD-ROM, a magneto-optical disk, a semiconductor memory or a hard disk.

DETAILED DESCRIPTION OF THE PREFERRED EMBODIMENTS

Figure 1:
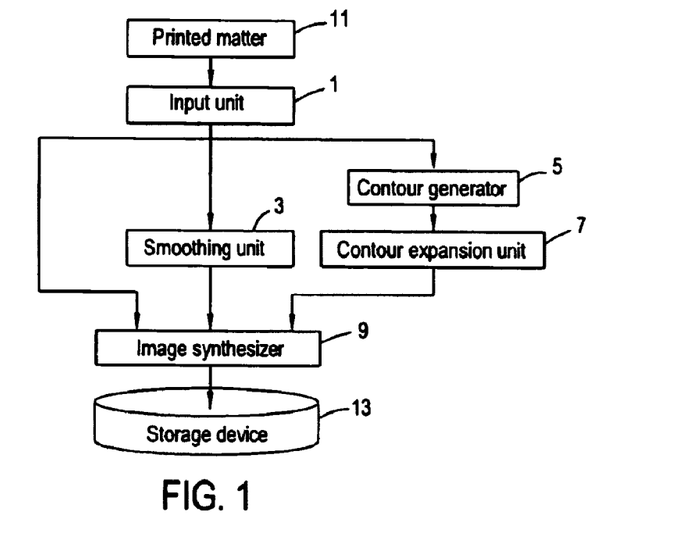
FIG. 1 is a block diagram illustrating an overview of an image processing apparatus in accordance with an embodiment of the present invention.

FIG. 1 is a functional block diagram illustrating an image processing apparatus according to the preferred embodiment of the present invention. The image processing apparatus comprises: an input unit 1, for generating an input image; a contour generator 5, for generating a contour extracted image and a partial contour image from the input image; a contour expansion unit 7, for generating a contour expanded image from the partial contour image; a smoothing unit 3, for generating a smoothed image from the input image; and an image synthesizer 9, for generating a superimposed image from the input image, the smoothed image, and the contour expanded image. The input unit 1 is, for example, a scanner that optically reads printed matter 11 having dotted print contents. The superimposed image that is output by the image synthesizer 9 is stored, for example, on a storage device 13. The input image, the contour extracted image, the partial contour image, the contour expanded image and the smoothed image, which are obtained during the processing, may be stored on the storage device 13.

Figure 2A:
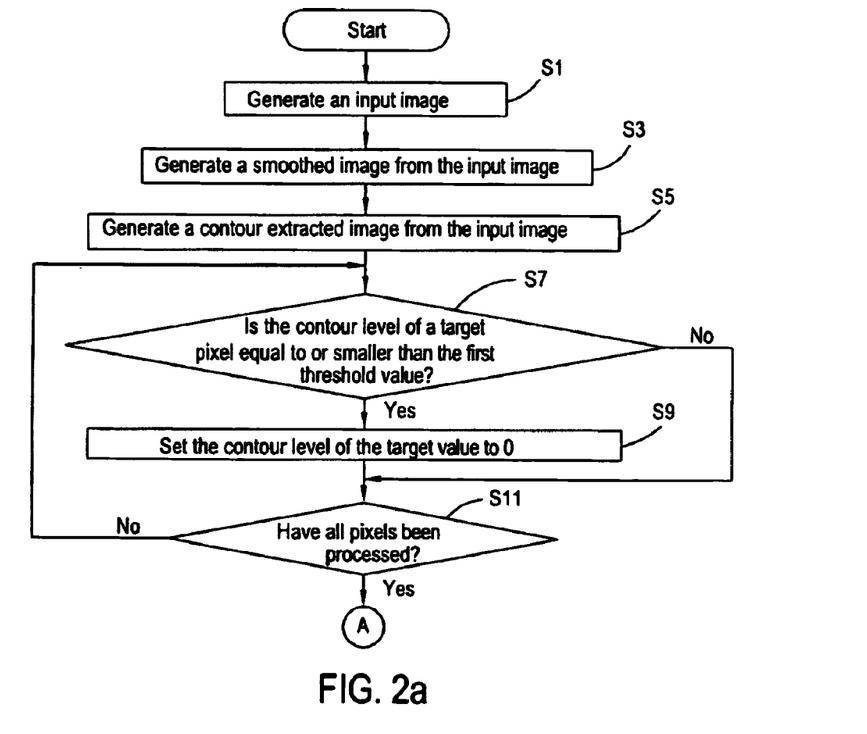
FIG. 2a is a first portion of a flowchart showing the processing performed for the embodiment of the present invention.
Figure 2B:
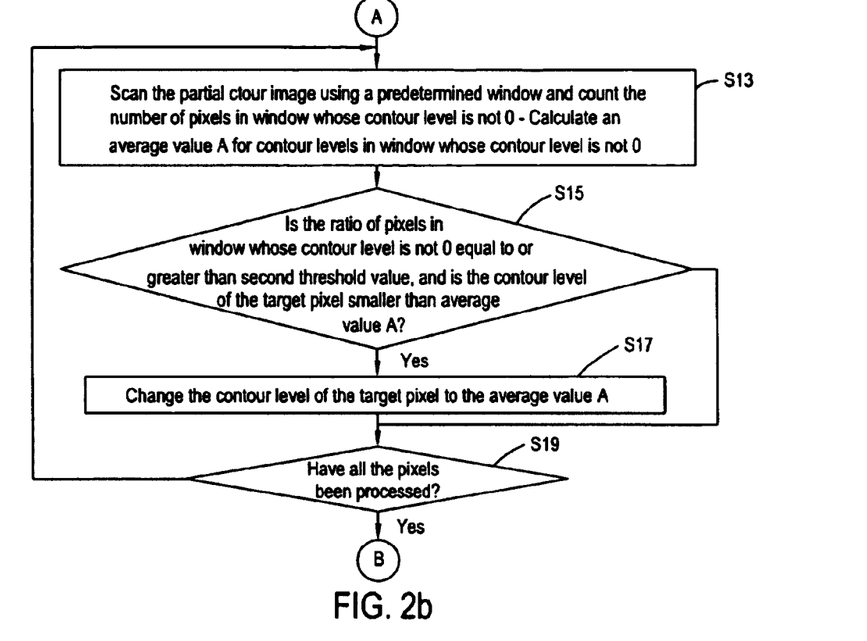
FIG. 2b is a second portion of a flowchart showing the processing performed for the embodiment of the present invention.

The processing of the individual functions in FIG. 1 will now be described while referring to the flowchart in FIGS. 2a, 2b and 2c. When the processing starts, the input unit 1 reads the printed matter 11 into the image processing apparatus as a multi-valued image, and generates an input image (step S2 in FIG. 2a). Since the input unit 1 performs the process in an unaltered conventional manner, no further explanation will be given for it. Then, the smoothing unit 3 receives the input image from the input unit 1, and smoothes the input image to obtain a smoothed image (step S3). For the smoothing process, a two-dimensional smoothing filter having a 3×3 pixel size is employed. In the filter, each weight coefficient is ⅑. Note that these parameters are merely examples, and appropriate numerals can be selected so that the printed dots of the input image and the moire patterns caused by the printed dots of the input image are smoothed into the continuous gradation, that is, so that the moire patterns and etc. disappears. An example smoothing process is shown in FIG. 3. The input image shown on the left is shaded because of printing dots, whereas for the smoothed image (on the right) obtained by smoothing the input image, the printing dots and etc. are smoothed. Since the smoothing process is substantially the same as the conventionally performed one, no further explanation will be given for it.

The contour generator 5 receives the input image from the input unit 1, and performs the contour extraction process for the input image to obtain a contour extracted image (step S5). The contour extraction process is a process for extracting the change point for a pixel density, and can be realized, for example, by performing a two-dimensional Sobel filtering process for the input image. The Sobel filtering process is a process for extracting a density change point for each set of three pixels, and includes a process for emphasizing the effect of the middle pixel. Since the contour extraction process is also performed substantially in the same manner of the conventional technique, no further explanation will be given for it.

Then, the contour generator 5 determines whether a contour level L1 of each pixel in the contour extracted image is equal to or smaller than a first threshold value T1 (step S7). The first threshold value T1 is a value higher than the contour levels due to the printing dots and moire patterns in the contour extracted image and lower than the contour levels of the other portion of the contour extracted image. This is because the printing dots and the moire patterns are distributed in various places in the extracted contour image, and their contour levels are low, while the actual contours appear thick in the contour extracted image and its contour level is high. In an actual case, it may be necessary to use a value obtained in accordance with an empirical rule as the first threshold value T1 during the step S7, S9 and S11, and to perform the step S7, S9, and S11 again after the value is adjusted slightly if a problem occurs.

If the contour level L1 is equal to or smaller than the first threshold value T1, the contour generator 5 sets the contour level of the target pixel to 0 (step S9). If the contour level L1 is greater than the first threshold value T1, the target pixel is not processed. The contour generator 5 repetitively performs the processing at steps S7 and S9 until all the pixels in the contour extracted image have been processed (step S11). If all the pixels in the contour extracted image have been processed, a partial contour image is obtained. The processing is moved to FIG. 2b via the terminal A. Since the moire patterns and the printing dots are produced during the contour extraction process at step S5, and remain in the contour extracted image, the pixels of the contour level that are equal to or smaller than the first threshold value T1 are determined to be moire patterns and etc, and are deleted from the contour extracted image. At this time, the actual contour, which should not be deleted, is also deleted if the contour level is low.

Figure 3:
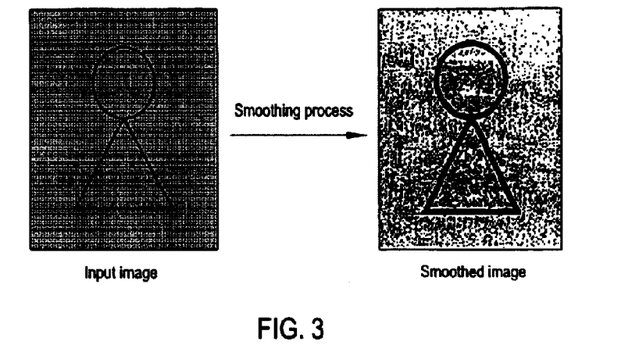
FIG. 3 is a diagram showing the smoothing process performed by a smoothing unit 3.
Figure 4:
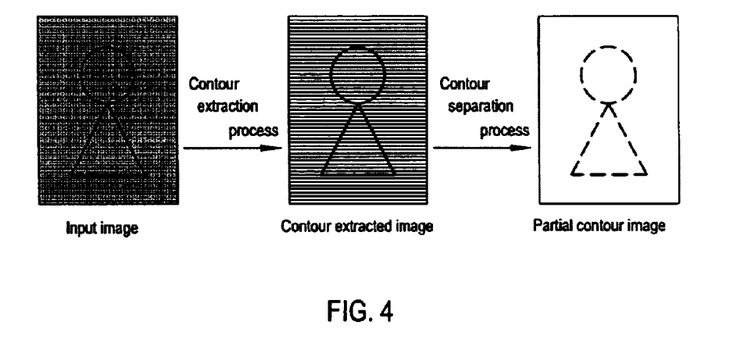
FIG. 4 is a diagram showing the process performed by a contour generator 5.

The processing at steps S5, S7, S9 and S11 is shown in FIG. 4. The input image on the left is the one shown in FIG. 3. If the contour extraction process is performed for this input image, the contour extracted image in the middle of FIG. 4 is obtained. The contour extracted image includes actual contours that represent the figure of a person and the contours caused by printing dots and moire patterns. The contour separation process is performed to delete the contour caused by the printing dots and the moire patterns in accordance with the first threshold value T1, which is appropriately set. The partial contour image that is the result of the contour separation process is shown on the right. While emphasized in the partial contour image, the actual contours that represent the figure of a person are cut into segments, and an image with clear contours can not be generated.

Therefore, the contour expansion unit 7 scans the partial contour image using a predetermined two-dimensional window, and then counts the number C of the pixels in the window that do not have a contour level of 0. In addition, the contour expansion unit 7 calculates an average value A for the contour levels of the pixels in the window having a contour level that is not 0 (step S13 in FIG. 2b). The two-dimensional window has a pixel size of 5×5, for example.

The contour expansion unit 7 determines whether the ratio C/S (S denotes the number of all the pixels present in the window) which means the ratio of the pixels in the window having a contour level that is not 0 is equal to or greater than the second threshold value ($0 \leq T2 \leq 1$), and the contour level of the target pixel in the center of the window is smaller than the average value A (step S15). For example, the second threshold value T2 is 0.1. The second threshold value T2 is determined in accordance with how much of the contours in the partial contour image are to be recovered or added. If a large value is used as the second threshold value T2, of the contours, little is recovered or added. Whereas if a low value is used as the second threshold value T2, of the contours, much is recovered or added. Also in this case, it may be necessary to use a value obtained in accordance with an empirical rule as the second threshold value T2 during the step S13, S15 and S17, and to perform the step S13, S15, and S17 again after the value is adjusted slightly if a problem occurs.

If the condition at step S15 is satisfied, the contour expansion unit 7 changes the contour level of the target pixel to the average A (step S17). But if the condition at step S15 is not satisfied, i.e., if the ratio of the pixels in the window having a contour level which is not 0 is less than the second threshold value T2 or the contour level of the target pixels is equal to or greater than the average value A, no process is performed for the target pixel. The contour expansion unit 7 repeats the processing at steps S13, S15 and S17 until all the pixels are processed (step S19), and as a result, generates the contour expanded image. The processing is moved to FIG. 2c via the terminal B.

Figure 5:
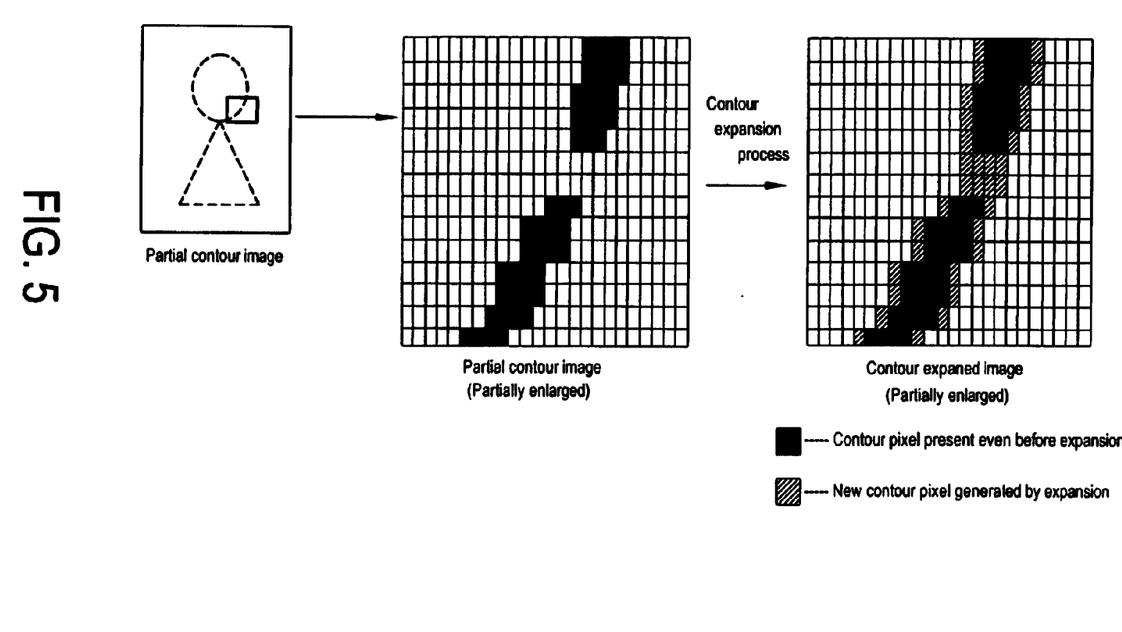
FIG. 5 is a diagram showing the process performed by a contour expansion unit 7.

An example process performed by the contour expansion unit 7 is shown in FIG. 5. The partial contour image in FIG. 4 is shown on the left, and the enlarged portion of the partial contour image is shown in the middle in FIG. 5. As shown in FIG. 5, the contour that is originally continued becomes discontinuous during the contour separation process. The result of the contour expansion process performed for this partial contour image is shown in the right of FIG. 5. The image that is thus obtained is shown on the right in FIG. 5. The solid black pixels are contour pixels that were already present in the partial contour image, and the shaded pixels are those that are recovered or added when the contour expansion process was performed. As shown on the right in FIG. 5, the discontinuous contour portions are linked together by contour pixels that are recovered or added. In addition, contour pixels that are recovered or added to expand the contour are provided around the contour pixels that were already present in the partial contour image. Therefore, if the contour density distribution in the partial contour image is analyzed by scanning the image using the two dimensional window, and the contour pixels are generated in accordance with the contour density distribution, the original contour portions that were deleted during the contour separation process can be recovered, and an image with clear contours can be obtained.

Figure 6:
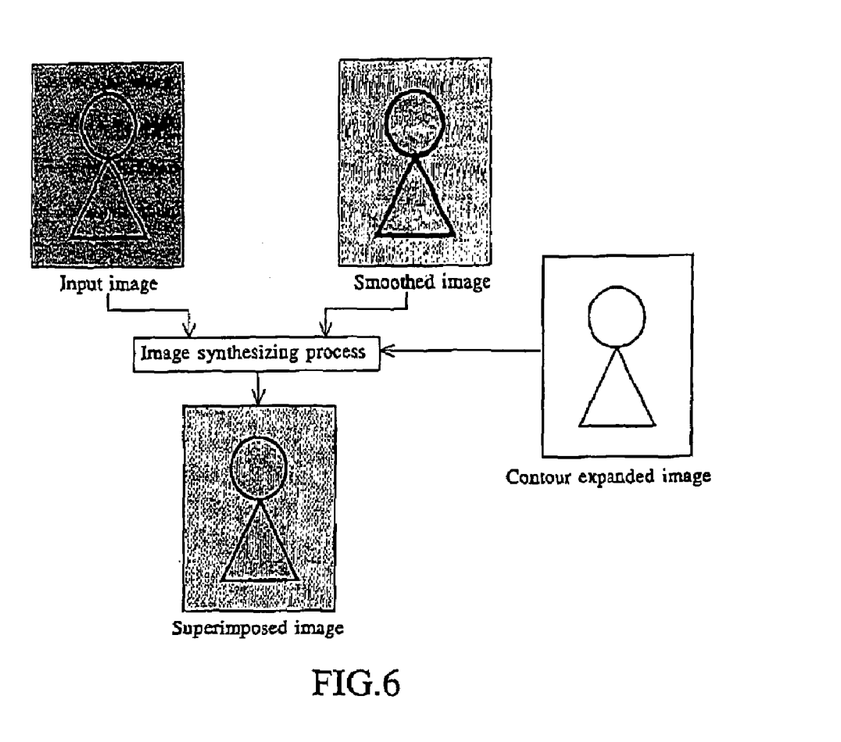
FIG. 6 is a diagram showing the process performed by an image synthesizer 9.

Through the above processing, all image data are generated that are to be used by the image synthesizer 9. As shown in FIG. 6, the image synthesizer 9 scans the respective pixels of the input image, the smoothed image and the contour expanded image in the same manner, superimposes the input image and the smoothed image while referring to the contour expanded image, and generates a superimposed image. During the superimposing process, for each pixel in the contour expanded image whose contour level is high, a pixel value of a corresponding pixel in the input image rather than the smoothed image is employed with priority to determine the pixel value of the corresponding pixel in the superimposed image. For each pixel in the contour expanded image whose contour level is low, a pixel value of a corresponding pixel in the smoothed image rather than the input image is employed with priority. More specifically, the following processing is performed.

Figure 2C:
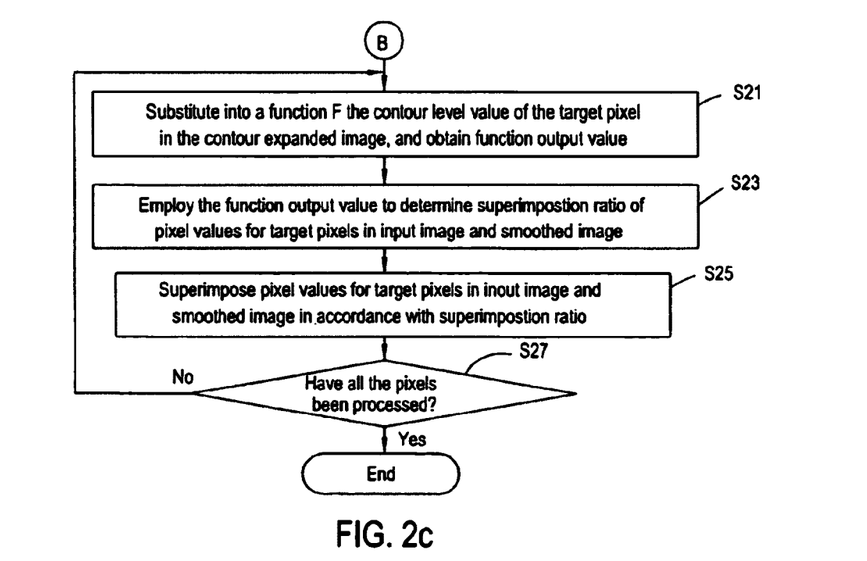
FIG. 2c is a third portion of a flowchart showing the processing performed for the embodiment of the present invention.
Figure 7:
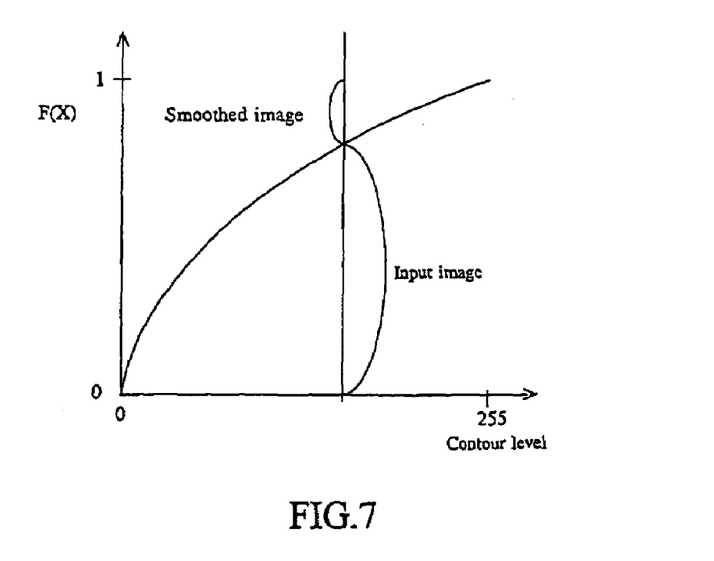
FIG. 7 is a diagram showing a function F(X) used by the image synthesizer 9.

First, the image synthesizer 9 substitutes into a function F(X) the contour level value L2 of a target pixel in the contour expanded image, and obtains a function output value (step S21 in FIG. 2c). In this case, for example, the function F(X) is a monotone, non-decreasing function that falls within the range represented by $0 \leq F(X) \leq 1$. It has been found through experience that a convex function is preferable to obtain satisfactory results. More specifically, $F(X) = (X/255)^{1/2}$ is used, wherein X is a contour level value and falls within the range represented by $0 \leq X \leq 255$. That is, in this example there are 256 contour levels. $F(X) = (X/255)^{1/2}$ is shown in FIG. 7. The output value ranges from 0 to 1, and represents an upward convex function. At step S21, F(L2) is calculated.

Then, the image synthesizer 9 employs the function output value F(L2) to determine the superimposition ratio of the pixel values for the target pixels in the input image and the smoothed image (step S23). In this embodiment, the superimposition rate of the pixel value for the input image is F(L2), and the superimposition rate of the pixel value for the smoothed image is 1−F(L2). That is, the superimposition ratio of these pixel values is F(L2):(1−F(L2)), which is also represented in FIG. 7. The portion below the function F(X) represents the superimposition rate of the pixel value for the input image, and the portion above the function F(X) represents the superimposition rate of the pixel value for the smoothed image. The image synthesizer 9 superimposes the pixel values of the target pixels in the input image and the smoothed image in accordance with the superimposition rates (step S25). If the pixel value of a pixel in the input image is defined as L3 and the pixel value of a corresponding pixel in the smoothed image is defined as L4, the pixel value of the target pixel is F(L2)×L3+(1−F(L2))×L4. The above processing performed at steps S21, S23 and S25 is repeated for all the pixels (step S27). As a result, for each pixel in the contour expanded image whose contour level is high, a pixel value of a corresponding pixel in the input image rather than the smoothed image is employed with priority to determine the pixel value of the corresponding pixel in the superimposed image. For each pixel in the contour expanded image whose contour level is low, a pixel value of a corresponding pixel in the smoothed image rather than the input image is employed with priority to determine the pixel value of the corresponding pixel in the superimposed image. The image synthesizer 9 controls the superimposition ratio in a level-less manner by using the continuous function F(X) that employs, as input parameters, the contour levels of the individual pixels in the contour expanded image. Thus, the borders between the contours of the superimposed image and the other portions can be smoothed, so that a multi-valued image having a more natural appearance can be obtained.

Through the above processing, an image in which regions which include a lot of printing dots and moire patterns are smoothed with continuous gradation (the smoothed image is used with priority and in which an original image (the input image) information of contour portions which do not include printing dots and moire patterns so much is maintained can be generated from printed matter which includes dotted print contents. As a result, a multi-valued image having a more natural appearance can be obtained.

As described above, an image processing apparatus of the embodiment generates a contour extracted image by performing the contour extraction process for the input image, and deletes contours from the contour extracted image that satisfy a predetermined condition to generate a partial contour image. Then, it adds contours to the partial image in accordance with the density distribution of the contour in the partial contour image, and generates a contour added image. By referring to the contour added image, it superimposes the input image and a smoothed image obtained by performing a smoothing process for the input image to generate a synthesized image. Since contours that satisfy a predetermined condition are deleted from the contour extracted image, the moire patterns included in the contour extracted image are removed. In addition, since contours are added according to the density distribution of the contour, necessary contours can be recovered.

The above embodiment is merely an example, and can be variously modified. For instance, the division manner of the functional blocks is not limited to that shown in FIG. 1, and the contour generator 5 may be divided into a contour extractor (step S5 in FIG. 2a) and a contour separator (for portions at other than step S5 in FIG. 2a). Further, the input unit 1 may not be included, and instead, an input image can be generated by another device. In addition, the contour extractor (step S5 in FIG. 2a) may be provided for a separate device.

Furthermore, at step S15 in FIG. 2, as a condition, the ratio of pixels in the window having a contour level that is not 0 is equal to or greater than the second threshold value, and the contour level of the target pixel is smaller than the average value A. However, as another condition, the ratio of pixels in the window having a contour level that is not 0 may be equal to or greater than the second threshold value, while the contour level of the target pixel may be 0. Since before step S15 a pixel having a contour level that is not 0 has a contour level that is equal to or greater than the first threshold value, the contour is not lost even if no particular process is performed for a pixel that has a contour level that is not 0 but that is smaller than the average value A. In accordance with this condition, only those contour pixels are generated that are to be newly added.

The threshold values, the window and the function are merely examples, and various values can be employed for the properties of the input image.

To execute the processing in FIG. 2, either a program or a dedicated circuit may be prepared. If such a program is prepared, the program can be stored on a storage medium or a storage device, such as a floppy disk, a CD-ROM, a DVD, an HDD or a semiconductor memory.

As shown above, the present invention can provide an image processing technique for generating a multi-valued image with clear contours from an input image that is generated by reading, as a multi-valued image, the dotted print contents of printed matter into, and that includes printing dots and moire patterns.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An image processing apparatus comprising:
    a contour image generator for generating a contour image from an input image generated by reading, as a multi-valued image, print contents of printed matter;
    a contour adder for adding contours to said contour image by referring to a contour density distribution in said contour image to generate a contour added image; and
    an image synthesizer for superimposing said input image and a smoothed image obtained by performing a smoothing process for said input image, by referring to said contour added image, to generate a synthesized image,
    wherein said contour adder comprises:
    a determination unit which scans said contour image with a predetermined window, and determines whether a density of contour pixels in said predetermined window is equal to or greater than a threshold value concerning the density;
    a calculator which calculates an average value of contour levels of contour pixels in said predetermined window; and
    a change unit which changes a contour level of a target pixel in said predetermined window to said average value if the density of the contour pixels in said predetermined window is equal to or greater than said threshold value concerning the density and a contour level of a target pixel in said predetermined window is smaller than said average value,
    wherein the density of the contour pixels is calculated by dividing a number of pixels in said predetermined window that have a contour level higher than a predetermined level by a total number of pixels in said predetermined window.

2. The image processing apparatus according to claim 1, wherein said contour image generator includes a deletion unit which deletes a contour pixel within said contour image, said contour pixel satisfying at least one condition wherein a contour level of said contour pixel is equal to or smaller than a predetermined threshold value.

3. The image processing apparatus according to claim 2, wherein said predetermined threshold value is a value for a contour level higher than a contour level caused by printing dots that result from printing and moire patterns that occur when the print contents are read.

4. The image processing apparatus according to claim 1, wherein said image synthesizer determines a superimposition ratio for a pixel value of a pixel in said input image and a pixel value of a corresponding pixel in said smoothed image by referring to the contour levels of respective pixels in said contour added image.

5. The image processing apparatus according to claim 4, wherein said superimposition ratio is determined by substituting said contour levels of said respective pixels in said contour added image into a predetermined function.

6. An image processing method, comprising:
generating a contour image from an input image generated by reading, as a multi-valued image, print contents of printed matter;
adding contours to said contour image by referring to a contour density distribution in said contour image and generating a contour added image; and
superimposing said input image and a smoothed image obtained by performing a smoothing process for said input image, by referring to said contour added image, and generating a synthesized image,
wherein said adding comprises
scanning said contour image with a predetermined window, and determining whether a density of contour pixels in said predetermined window is equal to or greater than a threshold value concerning the density;
calculating an average value of contour levels of contour pixels in said predetermined window; and
changing a contour level of a target pixel in said predetermined window to said average value if the density of the contour pixels in said predetermined window is equal to or greater than the threshold value concerning the density and the contour level of the target pixel in said predetermined window is smaller than said average value,
wherein the density of the contour pixels is calculated by dividing a number of pixels in said predetermined window that have a contour level higher than a predetermined level by a total number of pixels in said predetermined window.

7. The image processing method according to claim 6, wherein said generating includes deleting a contour pixel within said contour image, said contour pixel satisfying at least one condition wherein a contour level of said contour pixel is equal to or smaller than a predetermined threshold value.

8. The image processing method according to claim 7, wherein said predetermined threshold value is a value for a contour level higher than a contour level caused by printing dots that result from printing and moire patterns that occur when the print contents are read.

9. The image processing method according to claim 6, wherein said synthesizing comprises determining a superimposition ratio of a pixel value of a pixel in said input image and a pixel value of a corresponding pixel in said smoothed image by referring to the contour levels of respective pixels in said contour added image.

10. A computer program product stored on a storage medium and including an image processing program for execution on a computer, said image processing program comprising:
generating a contour image from an input image generated by reading, as a multi-valued image, print contents of printed matter;
adding contours to said contour image by referring to a contour density distribution in said contour image, and generating a contour added image; and
superimposing said input image and a smoothed image obtained by performing a smoothing process for said input image, by referring to said contour added image, and generating a synthesized image,
wherein said adding comprises
scanning said contour image with a predetermined window, and determining whether a density of contour pixels in said predetermined window is equal to or greater than a threshold value concerning the density;
calculating an average value of contour levels of contour pixels in said predetermined window; and
changing a contour level of a target pixel in said predetermined window to said average value if the density of the contour pixels in said predetermined window is equal to or greater than the threshold value concerning the density and the contour level of the target pixel in said predetermined window is smaller than said average value,
wherein the density of the contour pixels is calculated by dividing a number of pixels in said predetermined window that have a contour level higher than a predetermined level by a total number of pixels in said predetermined window.

11. The computer program product according to claim 10, wherein said generating includes deleting a contour pixel within said contour image, said contour pixel satisfying at least one condition wherein a contour level of said contour pixel is equal to or smaller than a predetermined threshold value.

12. The computer program product according to claim 11, wherein said predetermined threshold value is a value for a contour level higher than a contour level caused by printing dots that result from printing and moire patterns that occur when the print contents are read.

13. The computer program product according to claim 10, wherein said synthesizing comprises determining a superimposition ratio for a pixel value of a pixel in said input image and a pixel value of a corresponding pixel in said smoothed image by referring to the contour levels of respective pixels in said contour added image.

14. The computer program product according to claim 13, wherein said superimposition ratio is determined by substituting said contour levels of said respective pixels in said contour added image into a predetermined function.

* * * * *